United States Patent [19]
Watts

[11] Patent Number: 5,143,411
[45] Date of Patent: * Sep. 1, 1992

[54] THREADED TUBULAR CONNECTION

[76] Inventor: John D. Watts, P.O. Box 79466, Houston, Tex. 77279

[*] Notice: The portion of the term of this patent subsequent to Mar. 21, 2006 has been disclaimed.

[21] Appl. No.: 705,328

[22] Filed: May 24, 1991

Related U.S. Application Data

[63] Continuation-in-part of Ser. No. 315,271, Feb. 24, 1989, Pat. No. 5,018,771, which is a continuation-in-part of Ser. No. 897,069, Jul. 18, 1986, Pat. No. 4,813,717, which is a continuation of PCT/US85/0260, Feb. 19, 1985, abandoned, which is a continuation of PCT/US84/1936, Nov. 23, 1984, abandoned.

[51] Int. Cl.⁵ .................................................. F16L 25/00
[52] U.S. Cl. ..................................... 285/333; 285/397
[58] Field of Search ............... 285/333, 334, 355, 390, 285/397; 403/343

[56] References Cited

U.S. PATENT DOCUMENTS

| | | | |
|---|---|---|---|
| 1,364,478 | 1/1921 | Boyd et al. | 285/333 X |
| 1,562,373 | 11/1925 | Sheldon | 285/383 X |
| 1,703,232 | 2/1929 | Gray et al. | 285/390 X |
| 1,932,427 | 10/1933 | Stone | 285/334 |
| 2,094,491 | 9/1937 | Janata | 285/333 |
| 2,345,725 | 4/1944 | Bettis | 285/333 |
| 3,572,771 | 3/1971 | Redwine | 285/333 X |
| 4,508,375 | 4/1985 | Patterson | 285/334 |
| 4,588,213 | 5/1986 | Bollfrass | 285/333 X |
| 4,629,225 | 12/1986 | Rowsey | 285/333 X |
| 4,813,717 | 3/1989 | Watts | 285/333 |

Primary Examiner—Dave W. Arola

[57] ABSTRACT

A high efficiency an integral, non-upset, full strength, threaded pipe connection that has at least one swaged end. A box swage at 81 and 85 or a pin swage at 82 and 88. Thread engagement extends substantially to the bore of the box and substantially to the outermost diameter of the pin so as to prevent reduction of the cross section area of the wall of the joint.

8 Claims, 3 Drawing Sheets

U.S. Patent
Sep. 1, 1992
5,143,411
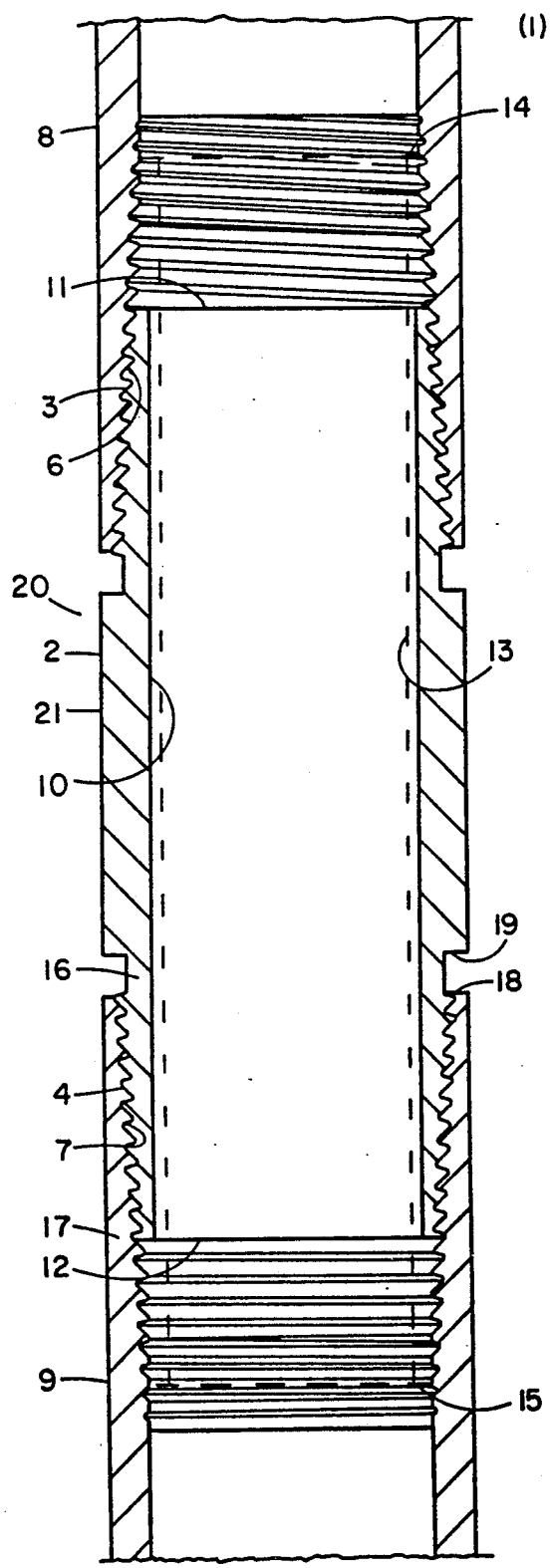
FIG. 1
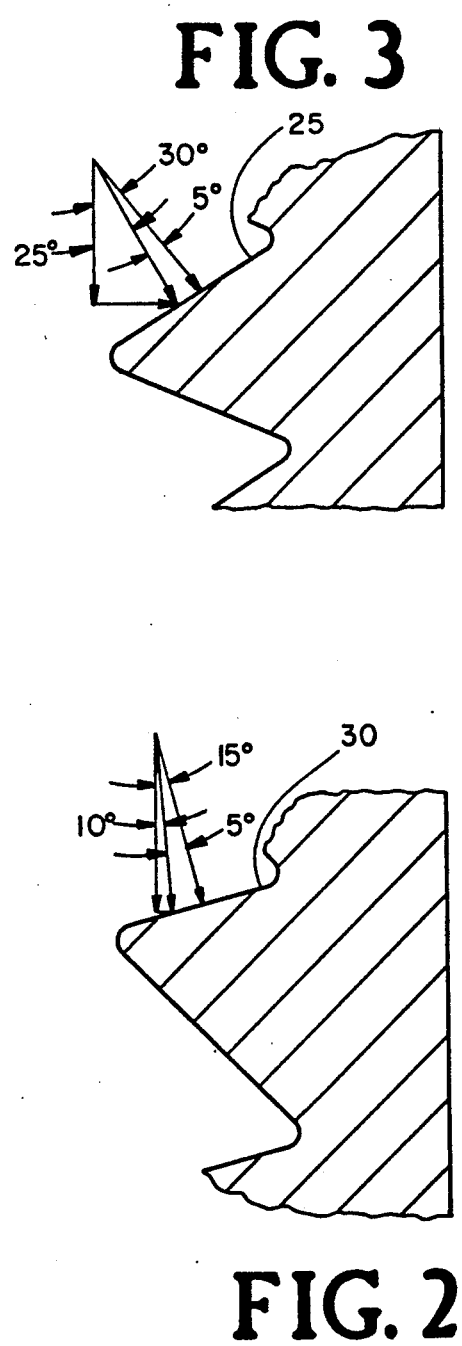
FIG. 3
FIG. 2

THREADED TUBULAR CONNECTION

This application is a continuation-in-part of prior U.S. application Ser. No. 315,271, filed Feb. 24, 1989, and soon to issue as U.S. Pat. No. 5,018,771, which is a continuation-in-part of U.S. application Ser. No. 897,069, filed Jul. 18, 1986 and issued as U.S. Pat. No. 4,813,717, which was a continuation of PCT/US85/0260, filed Feb. 19, 1985, now abandoned, which was a continuation of PCT/US84/1936, filed Nov. 23, 1984, now abandoned.

TECHNICAL FIELD

The outer diameters of conventional threaded pipe couplings are substantially greater than the outer diameter of the pipe joints that they connect and the same is true for most strings of casing and tubing installed within oilwells, however, several constraints are presented by oilwells that are not normally present in surface piping systems. Each consecutive string including couplings, must pass within a hole bore diameter established by a drill or by a previously set string of pipe. Additionally, there must be sufficient clearance between that bore and the maximum diameter of the string being run so as to lower freely without sticking and to allow sufficient flow area through the annulus then formed for fluids, without causing an unacceptable pressure drop caused by friction of the flowing fluid. Thirdly, oilwell strings must withstand axial tension and compression loads caused by the weight of miles of pipe that may be hanging within the well. Further, oilwell strings may be subject to external fluid pressures being greater than internal pressures to thereby introduce tendency to collapse. For these and other reasons, joints with upset ends and high cost "premium connections" have been introduced to work in the presence of such constraints. However, such solutions result with the outer diameters of connections being greater than the outside diameter of the pipe joints that they connect. There do exist, connections for pipe not having upset ends wherein one end of a joint is threaded externally and the other end is threaded with a mating internal thread such that joints can be screwed together to result in a connection with an outer diameter no larger than the pipe mid-section. However, such joints, such as Hycril FJ Premium tubing connections enjoy only 43% axial tension strength as compared to the unthreaded pipe wall, about the same as non-upset API tubing connections. Presently, due to diameter constraints, a typical oilwell pipe program may be 5½ OD×2⅞OD×1.6 OD To be far more advantageous, a 2⅞ OD×1.6 OD×1.05 OD can often make an installation possible due to clearance or cost reasons that the typical program above could not, and in every case, a less expensive and a more efficient installation should result. Many tons of steel per oilwell may therefore be saved from waste. When a pipe having no reduced wall thickness contains fluid pressure, the axial stress within that wall caused by fluid pressure is approximately one-half of the circumferential stress within that wall caused by the same pressure and therefore a like amount of mechanical axial stress may be applied by pipe weight or the like, without the axial stress exceeding the circumferential stress. Reduction of the pipe wall thickness as be a thread formed on a joint of non-upset pipe, will therefore reduce still further, the magnitude of axial stress that may be dedicated to support the pipe weight. There is therefore a substantial need for a non-upset, integral tubular connection having a higher efficiency with no loss of the connections ability to seal against fluid pressure.

For assembly of conventional threaded connections, the external thread must be carefully aligned both axially and angularly, with the internal thread before stabbing so as to prevent cross-threading of the connection. It is then moved axially to contact the end thread of the pin with a thread of the box to thereby effect stab position. The length of the pin thread that then projects into the box is any, is known as stab depth. Then, while being careful to maintain said alignment, the pin is rotated into the box by hand to a "hand-tight" position after which, a wrench is used to tighten the pin to a position of full makeup. The Accuracy of stabbing often determines the effect of the connection. Connections that have been cross-threaded usually leak even after and proper makeup. Connections that are put into service in a cros-threaded condition will not only leak but will rupture at a small fraction of the rated load. It is therefore clear that a connection designed to prevent cros-threading is highly desirable to eliminate the danger and damage that can be caused by such leakage and rupture.

An upset pipe end is generally understood by the industry as being a pipe end that has been heated to a temperature above the lower critical temperature for the pipe metal and then formed under great pressure so as to gather axially, metal of the pipe wall and thereby increase substantially, the cross-section area of the pipe wall at that end of the pipe. After upsetting the end of a high strength pipe, API Specifications require that the entire joint of pipe be quenched and tempered, all of which can greatly increase the cost of a joint of pipe.

In an effort to improve the radial clearance and cost of a tubular connection and still retain significant strength, "near-flush" connections were introduced which comprise "swaged" pipe ends. Swaged pipe ends are formed at temperatures below the lower critical temperature, by moderate radial pressures that increase or decrease the mean pipe diameter of the swaged zone, but do not substantially change the cross section area thereof. The swaged end of a high strength pipe need only be stress relieved at a temperature below the lower critical temperature, which is far less costly than a quench and temper. A pipe end may be "swaged-in" to a smaller diameter to receive an external thread or it may be "swaged-out" to a larger diameter to receive an internal thread. Generally, the outermost diameter of swaged-out ends is less than an API Coupling O.D. but more than pipe body O.D.

A typical family of swaged pipe connections having efficiencies of 65% may seem to be adequate to an engineer while designing a well, if calculations indicate that pipe weight and fluid pressure will generate loads on the connections of only 50% of pipe strength. However, many factors deep in the earth can cause unexpected rupture of a connection, endangering both people and the environment, when well designs are based on pipe stress. For example: 0.19% strain will yield the body of API J55 pipe; 0.28% will yield N80; 0.38% will yield P110. If a high efficiency connection allows the strain of the pipe body to continue, it will usually accept 5% or more strain before rupture. However, if the parting load of a casing connection is less than the load to yield the pipe body, then the connection will part before strain reaches the low limits given above. Strains over 1% are often imposed on the casing of wells that produce from or near, over-pressured and under compacted reservoirs, of which there are many. If a connection parting load exceeds slightly, the load that will yield the pipe body, then the casing string will accept strains several times greater than if connection parting load is slightly below the pipe body yield load. To safely meet strain criteria for well design, connection efficiency should exceed the value=100×(pipe yield strength/pipe ultimate strength). Accordingly, casing connection strengths should exceed by some reasonable margin, the following % efficiencies: 73% for J55; 80% for N80 and P110 API Pipe Grades.

BACKGROUND ART

A flush joint tubular connection has inner and outer diameters substantially the same as the tubing joints which the connection connects. A flush joint tubular connection made by the Hydril Company and covered by numerous patents comprise a first straight thread, a second straight thread of sufficient diameter to pass within the bore of the first thread and a tapered mating seat between the two joints of tubing which is a premium joint of high cost and according to published data, enjoys only 42% axial strength with regard to the pipe wall.

Standard A.P.I. non-upset tubing connections comprise couplings having outer diameters considerably larger than the pipe outer diameter but still only enjoy approximately 42% efficiency as above. A.P.I. does list a "turned down" collar outer diameter to increase clearance between strings, however, the "turned down" diameter still exceeds substantially, the pipe outer diameter.

No prior art discloses a flush joint tubular connection having tapered threads, that when properly assembled, effects optimum stresses within the small end of the external thread and within the large end of the internal thread so as to provide a connection of maximum efficiency. Conventional pipe connections have threads with like tapers and result in a constant diametrical interference along the taper between the external and internal threads, thereby causing excessive stresses or requiring increased wall thickness at the end of the pipe. Excessive stresses reduce the joint strength and an increased wall thickness rules out a flush joint connection.

It is therefore clear that a flush joint connection having a high efficiency as provided by the instant invention is needed for use within oilwells and other pipe assemblies wherein radial clearance is limited.

Standard pipe threads as well as A.P.I. threaded connections have such a tendency to cross-thread that "stabbing guides" are often used at a considerable cost of time and expense. Such threads have an extremely shallow stab depth and a relatively large thread depth, both of which add to the cross-thread problem. Perfect alignment is difficult to attain under normal field conditions and often impossible to attain under difficult conditions. Premium connections such as disclosed by Stone in U.S. Pat. No. 1,932,427 require even closer alignment to stab because of the close fit of straight threads and the "pin-nose" seal 32, which is highly susceptible to damage. To applicants belief no prior art comprised the combination of a deep stab, thread height and thread diameter as required to provide a tapered threaded connection that will stab easily and quickly without the possibility of cross-threading. By way of an example, a 2⅜ EU 8rd A.P.I. tubing thread has a 2.473" pin end diameter and a 2.437" box bore at the first thread which allows no entry of the pin into the box at stab position. The counterbore of the box allows entry of the pin only 0.446" affording at best, axial alignment but no angular alignment so less than six degrees of angular misalignment will allow it to cross-thread.

About 1940, A.P.I. changed from 10 V threads to 8rd and a substantial improvement resulted because less gauling occurred during makeup of the threads. It was then commonly assumed "that any thread finer than 8 threads per inch would gall and cross-thread" and that myth persists today. However, the improvement resulted almost entirely from the better thread form, eliminating the sharp edge V threads. The present invention with threads as fine as 20 per inch, run fast and smooth without cross-threading, and it has other features as well.

Conventional "near-flush" connections mentioned above, have two-step straight box threads formed within swaged-out ends and pin threads formed on swaged-in ends. Such swaged ends comprise a single tapered zone extending axially from the pipe body of original pipe diameters having a mean conical angle of taper of approximately two degrees. Typically, such swaged connections are rated by their suppliers as having from 50% to 75% efficiency depending on wall thickness, and with a variety of fluid pressure ratings. Such a swaged connection when compared to a 42% conventional flush joint connection, has improved strength, but at the expense of clearance.

To applicants best knowledge and belief, all such swaged connections now on the market are swaged to form only the degree of taper that approximates the lay of threads to be formed thereto. Typically, before a thread is machined in the tapered zone, a clean-up cut is made to assure there being enough metal to fully form the threads. Unfortunately, such a cut reduces the cross-section area of the tapered zone which limits connection efficiency. Additionally, production machining allows for only approximate axial positioning of the pipe in the machine prior to gripping the pipe in the chuck and such approximation can cause further thinning of the tapered zone. Thirdly, if first measurement of a freshly cut thread indicates that a thread recut is required, then the swage must be cut off and the end reswaged before even a 75% thread could be cut at that end. Therefore, in addition to the basic disadvantages of a two-step thread having a pin-nose seal, it is now even more clear why suppliers of pipe threads that are formed on swaged ends cannot provide a family of pipe connections with efficiencies greater than 75%.

Applicants U.S. Pat. No. 4,813,717 which is in the line of priority for the present application, discloses a connection with selective efficiency between 75% and 100% for non-upset pipe using a coupling in one embodiment per claims 1-17 and an integral connection in another embodiment per claims 18-19. The present invention is complimentary to said patent and teaches configurations for connections having swaged ends. To applicants best knowledge and belief, no non-upset integral connection is currently available that will meet the strain design criteria above. For users who prefer integral non-upset pipe connections, there is clearly a need for one with an efficiency sufficient to meet the strain design criteria defined above.

DISCLOSURE OF INVENTION

The present invention provides a connection for non-upset joints of oilwell tubing or the like, having a tubular coupling formed with tapered external threads thereon for mating with tapered internal threads formed within the ends of the non-upset tubing joints to be connected.

The coupling may be formed of a material having a higher strength than the material from which the tubing joints are formed so as to allow higher circumferential stresses within the small end of the male threads which is of a thinner wall than the tubing wall thereby adjacent, so as to provide a higher sealing force between the mating threads in the primary seal area. The use of higher strength material for the coupling also provides a higher axial load capacity than would be provided should the male thread be formed on the tubing joint and increases wear life due to the higher hardness.

So as to avoid the pullout tendency inherent in a non-upset tubing thread having conventional 60 degree thread flanks with respect to the tubing axis, a thread form is provided that has a load bearing flank angle of 75 degrees or more, the optimum angle depending on such factors as the pipe diameter, the wall thickness and the material strength.

As taught by my series of patents beginning with U.S. Pat. No. 2,766,829 which have enjoyed worldwide commercial success for over 30 years in the oilfield, the space industry and the nuclear industry, the taper of the external thread is formed at a lesser angle than the taper of the internal thread so as to ensure a maximum primary sealing tendency at the smallest pressure area so as to minimize the axial load imposed on the connection due to internal fluid pressure. The present invention utilizes this feature in combination with other features.

Accordingly, initial thread engagement occurs on the external thread at the small end only, simultaneously as a radially spaced relationship exists between the internal and external threads elsewhere. As the connection is tightened toward full makeup, thread contact increases progressively from the small end toward the end of the tubing joint. The threads may be dimensioned such that at full makeup, the threads at the larger end are in contact and the circumferential stresses within the tubing joint are less than the circumferential stresses within the small end of the male thread, ideally in proportion to their respective yield strengths.

The use of flank angles that reduce pullout tendency also allows the use of shallower threads such as a thread depth of 0.030" instead of thread depths as used by A.P.I. i.e., 0.0556" for 10 round threads and 0.0712" for 8 round threads for conventional tubing connections. In turn, the shallower thread depth allows for a higher connection efficiency because a smaller portion of the coupling wall is removed to form the thread and thereby, a thinner coupling wall may be used which, in turn, improves radial clearance of the connection and, in turn, makes possible a high efficiency flush joint connection.

So as to preclude excessive circumferential stresses of one cooperating threaded member before full makeup of the two, the wall thickness of the two near the small end of the engaged threads may be dimensioned inversely proportional to the strengths of the materials of each. Since moduli of elasticity is substantially the same for both members, both members will therefore be stressed to substantially the same percentage of their respective material strengths.

Should the innermost diameter of the connector be of prime importance, the coupling bore may be dimensioned slightly larger than the standard drift diameter for that size tubing.

The coupling may be provided with a shoulder to abut the end of the tubing joint upon full makeup, should conditions require precise makeup lengths, higher torque capacity or greater bending strengths.

The present invention prevents cross-threading during make-up of the connection by providing the combination of a stab depth, a thread diameter and a thread form dimensioned for a tapered threaded connection such that the maximum angle of misalignment that is possible at stab position is less than the minimum angle at which cross-threading can occur. The tendency to cross-thread decreases as: the stab depth increases; the thread height decreases; the thread diameter decreases; the axial thread pitch increases; the crest width decreases. At stab position, the stab flank of the pin thread of smallest diameter will contact a stab flank of the box around the circumference of said pin thread. The stab depth is interdependent on the box thread bore at face of the box, the pin end thread diameter aND THE TAPER OF THE BOX THREAD. The diameter of the threads are often limited by constraints such as the tubular wall thickness and therefore, an accurate workable combination of these factors must be determined. When at stab position, the minimum angle at which cross-threading can occur is substantially equal to:

Ardtan$((P-2C/D)$, where:
P=axial thread pitch.
D=O.D. of smallest pin thread.
C=average width or radius of crests.

The maximum angle of mis-alignment that can occur when at stab position is substantially equal to:

Arctan$((H+G)/S)$, where:
H=height of thread form per side.
S=stab depth of pin into box thread.
G=radial gap between the internal thread of largest diameter and the radially adjacent external thread crest when at stab position. If pin and box tapers are equal then G=0.

Setting the angles equal and rearranging, defines the minimum stab depth for a given combination of D,H,G.P and C required to prevent cross-threading of the connection. $S=D(H+G)/(P-2C)$ To serve different conditions, various combinations may be used but any such combination that comprise a stab depth equal to or greater than S as defined above, is in accord with the present invention.

My U.S. Pat. No. 4,813,717 which is in the line or priority for the present application, provides for an integral pipe connection having an efficiency greater than 75% wherein an externally threaded end having a reduced bore, cooperates with a non-upset internally threaded end as in claims 18 or 19. The present application compliments that patent in that it teaches swage configuration that will allow a 100% efficient integral connection and that will also facilitate manufacture of the connection.

A joint of pipe may be swaged at one or both ends so as to have a substantially constant cross section area along the full length of the joint, so as to allow threading externally at one end and internally at the other end, such that the joints may be screwed together to form a string of pipe, wherein the minimum cross section area of the string will exceed 75% of the nominal pipe wall area. My patent noted above teaches extension of the engaged threads to the bore of the box so as to gain maximum cross section area of the box at the smallest engaged thread of the box. The present application in addition, teaches extension of the engaged threads to the O.D. of the swaged-down diameter threaded zone of the pin end so as to gain maximum cross section area at the largest diameter engaged thread of the pin.

So as to easily effect a 75% minimum area under normal manufacturing conditions, a preferred swage configuration is disclosed as follows. The swaged end comprises a first zone extending axially from the pipe body of original dimension on a first mean conical angle of taper. If this angle of taper is too great, bending of the pipe wall while under axial load can generate excessive stresses when combined with the axial stress. Conversely, if the angle is too small at the pin end, then neck-down tendency of a pipe under tension will tend to cause separation of the pin thread from the box thread. The present invention teaches the use of a first conical angle of taper of not less than five degrees nor more than fifteen degrees, so as to maintain the cooperating threads in contact and yet not cause excessive bending stresses in the pipe wall. The swaged end also comprises a second zone extending axially from the first zone on a second mean conical angle of taper, the second angle of taper being less than the first. The second zone may be formed with a substantially cylindrical configuration. Thus, the second zone having little or no taper, will allow for approximate positioning of the pipe in the machine prior to chucking and can allow for reasonable recut of the thread as may be required under normal manufacturing conditions. Also, a tapered thread may be cut in the second zone so as to "run-out" past the O.D. of the second zone to thereby provide a connection of 100% efficiency. This swage configuration clearly avoids the undesirable features of the conventional swage explained above.

Any metal removal from a joint of constant cross section area will reduce the cross section area to some extent, at that location. Therefore, it is highly desirable that the diameter of the pipe zone to be threaded, be formed before threading, as close to the finished diameter as reasonable manufacturing practice will allow. Swaging will allow selection of either the swaged outside diameter or the swaged inside diameter, the other diameter moving as directed by a constant cross section area. Therefore, if the finished inside diameter is considered to be substantially the swaged inside diameter, then the swaged outside diameter of the pin can be calculated upon which, the final thread diameters can be determined, after allowing for necessary clean-up cut. Therefore, an integral connection of maximum efficiency can be provided for any given non-upset pipe, in accord with the present invention.

BRIEF DESCRIPTION OF THE DRAWINGS

FIG. 1. depicts a vertical section of a connector in accord with the present invention.

FIG. 2. illustrates a thread form in accord with the present invention.

FIG. 3. illustrates a thread form in accord with conventional tubing joint threads.

DETAILED DESCRIPTION OF THE INVENTION

Figure 4:
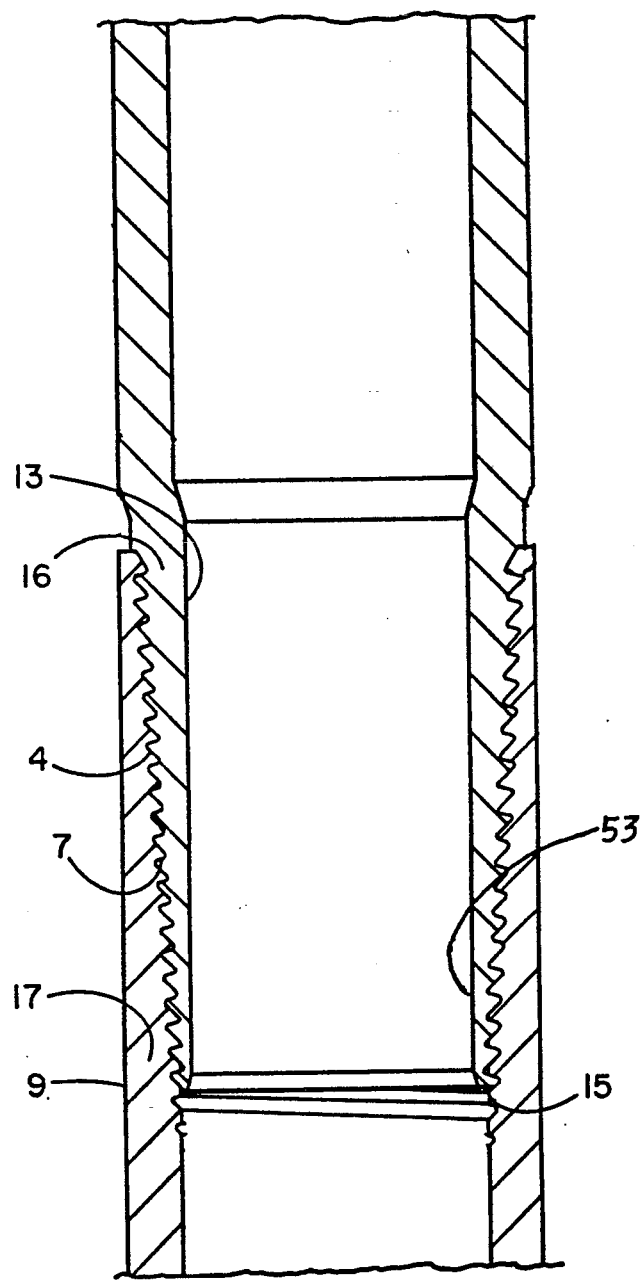
FIG. 4. depicts an embodiment of the present invention that provides shoulder abutment upon make-up.

FIG. 1 depicts tubular connection shown generally at 20 comprising coupling 2 with tapered external threads 3 formed on an upper portion and having like threads 4 formed on a lower portion, so as to mate in sealing engagement with tapered internal threads 6 and 7 formed within joints of non-upset tubing 8 and 9 respectively, to be connected.

Coupling 2 may comprise inner diameter 10, upper end surface 11 and lower end surface 12, said end surfaces not extending for the full length of internal threads 6 and 7. Such a connection, as limited by the tension area resulting between the root diameter of the last engaged thread as at 12, and the tubing outer diameter, may provide an axial tension strength in excess of three fourths of the pipe wall strength, effecting an efficiency greater than 75%.

Should a connection of higher strength be required, coupling 2 may be formed with inner diameter as at 13, upper end surface as at 14 and lower end surface as at 15. The coupling thereby extending for substantially the full effective length of the internal threads so as to provide a connection having an axial strength substantially equal to the pipe wall strength to thereby approach 100% efficiency.

Since typical tubing joints have lengths of sixty times or more the lengths of couplings that connect them, the couplings may be formed of material much stronger than the material the joints are formed of without causing significant increase of cost for the entire string. The use of higher strength material for the coupling 2 provides a higher axial strength for the connection 20 because, the strength of the coupling at neck section 16 is increased and because, collapse resistance of the pipe end as at 12 is increased to thereby increase the pullout strength also. To further increase the pullout strength of the connection, a thread form having a load bearing flank formed at 75 degrees with respect to the tubing axes as depicted in FIG. 2, may be used for the mating threads as opposed to the most common thread form used on oilwell tubulars, depicted in FIG. 3. The form of FIG. 3 has a load bearing flank 25 which effects an angle of 60 degrees with the tubing axis 24. Assuming an angle of friction of 5 degrees, elementary vector analysis will show that the form depicted in FIG. 2 results in a pullout strength 2½ times that of FIG. 3. Reduction of the flank angle still further, can virtually eliminate tendency to pullout.

So as to ensure a seal diameter for the connection of least diameter and therefore the least axial fluid load, the taper of the external thread may be made slightly less than the taper of the internal thread. Such a condition also allows maximum radial compression of the coupling as at end surface 12 adjacent pipe wall as at 17 which may be formed thicker than the adjacent coupling wall. Thus, upon makeup, end 12 will compress more than wall 17 expands due to the difference in thickness, the moduli of elasticity being considered substantially the same. Since coupling 2 may be made of higher strength material than tubing joints 8 or 9, the thickness may be dimensioned such that stresses in walls at 12 and 17 are more nearly at the same percentage of the yield strength of the materials of which the members are formed.

When the taper of the external thread is made less than the taper of the internal thread, initial contact between the two occurs only at the small end as at 12 with the internal thread as at 17. Upon continued makeup, thread contact progresses toward the larger end of the tapers to cause full engagement of the threads as at 18. A slight amount of further makeup may cause a predetermined magnitude of circumferential stress within the end of the tubing joint as at 18 and thereby establish a position of full makeup, so as to cause: compressive circumferential stresses within end 12 to be at a first desired value, simultaneously with tension circumferential stresses within the tubing joint wall between 17 and 18 being at a second desired value, less in magnitude than said first value. Said values may be set at the same percentage of the unit yield strengths of the respective materials to thereby effect a maximum strength for the connection.

Connection 20 may comprise shoulder 18 formed on the end of joint 9 and shoulder 19 formed on coupling 2 intermediate thread 4 and the outer diameter 21 of coupling 2. The mating threads may be dimensioned so as to makeup as shown in FIG. 1 or should greater bending and compression strength or greater tortional strength be desired, the mating threads may be dimensioned and given closer tolerances so as to allow shoulders 18 and 19 to abut upon makeup.

FIG. 4 depicts a preferred bore configuration for the pin end which can include minimum bore diameter extending to the pin neck as at 13 and an outwardly tapering bore extending therefrom to the pin end as at 53 which is sufficiently larger than bore 13 so as not to restrict bore 13 upon contraction of bore 53 upon makeup of the connection. This preferred pin configuration may be formed on each end of a coupling and it may also be formed on the end of a pipe joint that has been swaged-down so as to provide for bore 13 being smaller than the nominal pipe bore.

Figure 5:
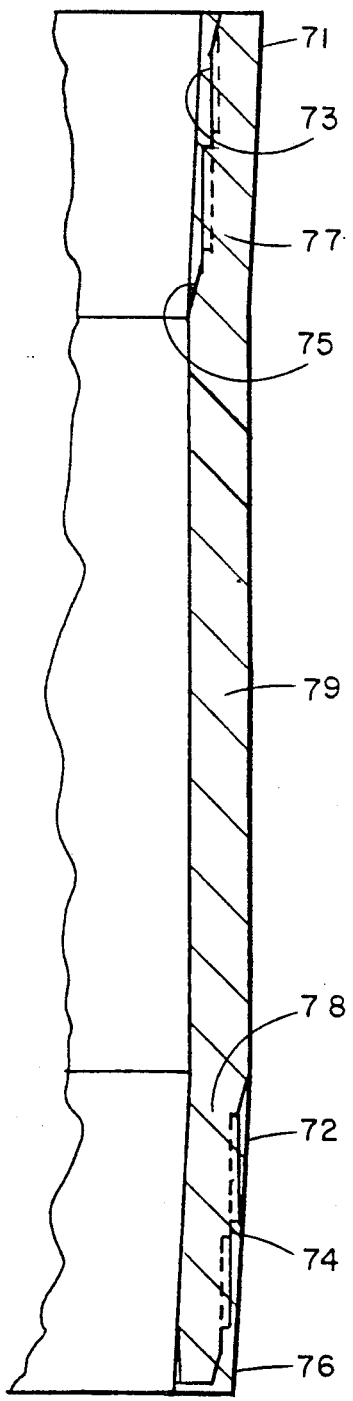
FIG. 5. depicts a fragmentary section of a swaged joint in accord with conventional practice.
Figure 6:
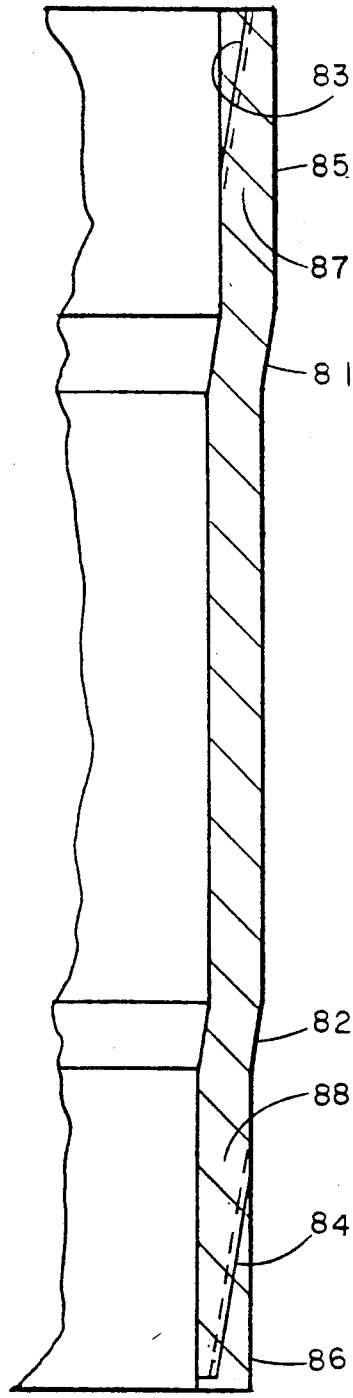
FIG. 6. depicts a fragmentary section of a swaged joint in accord with the present invention.
Figure 7:
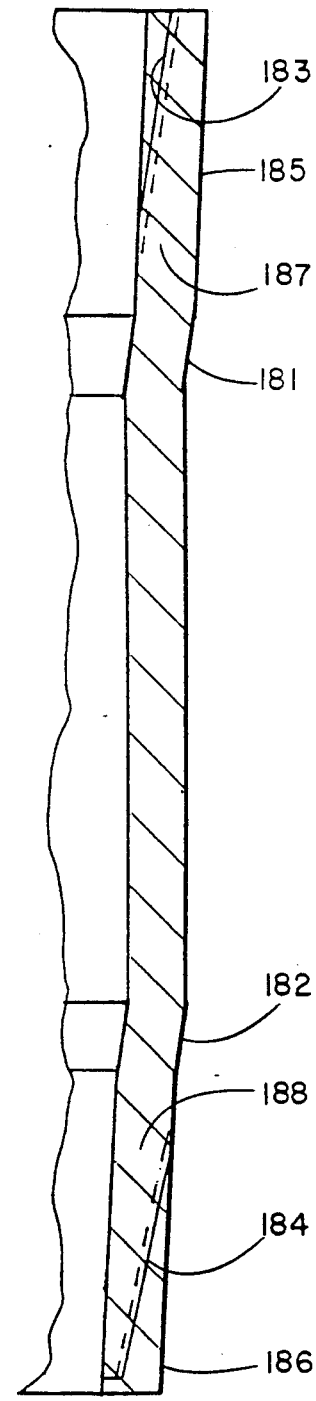
FIG. 7 depicts a variation of a swaged joint in accord with the present invention.

Conventional swaged ends as depicted in FIG. 5 comprise box tapered zone 71 and pin tapered zone 72, formed to receive conventional two-step threads 73 and 74 respectively wherein pin nose seal as at 76 is formed to cooperate in sealing engagement with a box seat as at 75. It is clear that box critical area 77 and pin critical area 78 will be substantially less than than the pipe wall area as at 79 after metal is removed to form the seats. Further, it is also clear that if the recut of an imperfect thread is required, that the critical area will be reduced even further as the same diameters are cut deeper into the conical section. It is now obvious why suppliers of such families of threads must limit efficiencies to nominally 65%. A box swage according to the present invention is depicted in FIG. 6 as at tapered zone 81 and zone 85 which may be formed as a cylinder as at 85 or it may be formed on a lesser taper as at 185 than zone 81, sufficient to allow easy axial positioning of the pipe in the machine prior to threading that end and to allow reasonable opportunity to recut the thread without substantial thinning of the wall. Likewise, a swaged end according to the present invention, to receive pin thread 84 is shown as at tapered zone 82 and zone which may be tapered as at 186 or cylindrical as at 86 as explained above. Numbers shown in FIG. 7 are 100 greater for similar features shown in FIG. 6.

Upon reviewing the disclosures of FIGS. 5 and 6, it is obvious that any thread could be cut in swaged ends in accord with the present invention depicted in FIG. 6 to eliminate the positioning and recut disadvantages of the conventional single tapered swage depicted in FIG. 5. However, only a connection with thread engagement that extends substantially to the bore of the box section as at 87 and substantially extends to the outermost diameter of the pin section, such as shown by the present invention as at 88, can develop maximum strength of an integral connection for non-upset pipe, which has no increase of cross section area at the ends.

Therefore, it is clear that swaged ends formed in accord with the present invention facilitate manufacturing and improve quality of the finished product by allowing for economical recut of an improperly made thread.

I claim:

1. A high efficiency integral connection for non-upset joints of oilwell pipe or the like, comprising: at least two joints of pipe joined together and forming joints of pipe, each joint of pipe being formed with tapered internal threads at a first end; the joints each having a second end formed with tapered external threads dimensioned such that one such joint may be sealingly connected directly with another such joint; the threads being of sufficient length and taper such that the wall strength of the first end in the area of the the smallest diameter of thread engagement is at least three-fourths of the average pipe wall strength and the wall strength of the second end in the area of the largest diameter of thread engagement is at least three-fourths of the average pipe wall strength.

2. The connection of claim 2 further comprising: at least one of the ends of the joint being swaged prior to threading such that the first end of the joint after swaging, has a larger mean diameter than does the second end.

3. The swaged joint of claim 2 wherein a swaged end comprises: a first zone extending axially from the pipe body of original dimension, on a first mean conical angle of taper; a second zone extending axially from the first zone on a second mean conical angle of taper; the second angle of taper being less than the first angle of taper.

4. The swaged joint of claim 3 futher comprising: the second zone having a substantially cylindrical configuration.

5. The swaged joint of claim 4 further comprising: the second zone being of such length and taper to permit selective axial positioning of the thread within the second zone, by a length of not less than the axial length of two threads.

6. The swaged joint of claim 4 further comprising: the first mean angle of taper being greater than five degrees.

7. The connection of claim 4 further comprising: the second zone of the second end being swaged down to a diameter substantially no smaller than is required for forming the external thread within the second zone.

8. The connection of claim 7 further comprising: the dimensions of the external thread being such that the bore of the second end as swaged, is substantially the same as the desired finished bore of that end so as to prevent reduction of the wall strength by substantial metal removal from the bore.

* * * * *

UNITED STATES PATENT AND TRADEMARK OFFICE
CERTIFICATE OF CORRECTION

PATENT NO. : 5,143,411
DATED : September 1, 1992
INVENTOR(S) : John Dawson Watts It is certified that error appears in the above-indentified patent and that said Letters Patent is hereby corrected as shown below:

Column 10, line 32, (claim 2) change "2" to --1--.

Column 10, lines 47, 52 and 54, (claims 5-7) change "4" to --3--.

Signed and Sealed this

Thirtieth Day of November, 1993

Attest:

BRUCE LEHMAN

Attesting Officer

Commissioner of Patents and Trademarks